(12) United States Patent
Meier

(10) Patent No.: US 10,098,274 B1
(45) Date of Patent: Oct. 16, 2018

(54) COMPOST INSERTION APPARATUS

(71) Applicant: Michael J. Meier, Tecumseh, KS (US)

(72) Inventor: Michael J. Meier, Tecumseh, KS (US)

( * ) Notice: Subject to any disclaimer, the term of this patent is extended or adjusted under 35 U.S.C. 154(b) by 0 days.

(21) Appl. No.: 15/708,301

(22) Filed: Sep. 19, 2017

(51) Int. Cl.
| | |
|---|---|
| *A01C 21/00* | (2006.01) |
| *A01C 3/06* | (2006.01) |
| *A01C 5/06* | (2006.01) |
| *A01B 49/06* | (2006.01) |
| *A01B 76/00* | (2006.01) |

(52) U.S. Cl.
CPC ............ *A01C 21/002* (2013.01); *A01B 49/06* (2013.01); *A01B 76/00* (2013.01); *A01C 3/06* (2013.01); *A01C 5/062* (2013.01); *A01C 5/068* (2013.01)

(58) Field of Classification Search
CPC ....... A01C 21/002; A01C 21/00; A01C 3/066; A01C 3/06; A01C 3/00; A01C 5/062; A01C 5/06; A01C 5/00; A01C 5/068; A01B 49/06; A01B 49/04; A01B 49/00; A01B 76/00
See application file for complete search history.

(56) References Cited

U.S. PATENT DOCUMENTS

| | | | | |
|---|---|---|---|---|
| 2,525,718 | A * | 10/1950 | Parker | ................... A01C 7/042 111/170 |
| 4,088,083 | A * | 5/1978 | Dail, Jr. | ................. A01B 33/16 111/13 |
| 4,396,504 | A * | 8/1983 | Tannehill | ........... B01D 33/0353 208/188 |
| 4,756,260 | A | 7/1988 | Petersen | |
| 4,801,085 | A * | 1/1989 | Fischer | ................... A01C 3/063 198/661 |
| 4,930,431 | A | 6/1990 | Alexander | |
| 6,029,590 | A | 2/2000 | Arriola et al. | |
| 7,748,331 | B2 | 7/2010 | Allan et al. | |
| 8,100,067 | B2 | 1/2012 | Sidhwa et al. | |
| 2011/0155031 | A1* | 6/2011 | Arnett | ..................... A01C 5/066 111/193 |

FOREIGN PATENT DOCUMENTS

JP        57190197 A   *  11/1982

OTHER PUBLICATIONS

Derwent-Acc-No. 2013-V20061, Mar. 19, 2013.*

* cited by examiner

Primary Examiner — Christopher J. Novosad
(74) Attorney, Agent, or Firm — Dale J. Ream

(57) ABSTRACT

A compost insertion apparatus coupled to a tractor for inserting solid material into the ground includes a frame configured to be pulled behind a tractor. A bin atop the frame defines an interior area capable of holding solid material, the bottom having an outlet through which the solid material is expelled from the bin. An auger assembly includes a shaft a continuous spiral blade operative for expelling the solid material. A ripper shank is movable from a use configuration forming a furrow, the solid material being expelled into the furrow. A furrow closer assembly includes two circular angled plates forming a V-shape for covering the solid material. A track assembly is operatively coupled to the frame for supporting the bin above the ground, the track assembly having a wide profile in contact with the ground.

7 Claims, 9 Drawing Sheets

COMPOST INSERTION APPARATUS

BACKGROUND OF THE INVENTION

This invention relates generally to soil treatment and compost spreading equipment and, more particularly, to an apparatus for inserting biosolids into soil evenly and efficiently.

Sewage sludge (also referred to as biosolids) refers to semi-solid material that is produced as a by-product during sewage treatment of industrial or municipal wastewater. To that end, the term "biosolid material" is interpreted as including sewage sludge that is caked, semi-liquid, or pelletized. More specifically, biosolids are nutrient-rich organic materials resulting from the treatment of domestic sewage in a treatment facility. When treated and processed, these residuals can be recycled and applied as fertilizer to improve and maintain productive soils and stimulate plant growth. Biosolids may include high levels of phosphorous and nitrogen which increase soil organic matter, improve the soil structure, and increase water holding capacity. It is understood that phosphorous, once applied to the ground surface, may take one year or longer to actually reach a depth in the soil for optimum plant uptake. This is even more evident for the application of ag-lime, which may take several years to affect plant uptake.

In practice, biosolids are used to fertilize fields in the raising of crops. Nutrients found in biosolids, such as nitrogen, phosphorus and potassium and trace elements such as calcium, copper, iron, magnesium, manganese, sulfur and zinc, are beneficial for crop production. The use of biosolids reduces the farmer's production costs and replenishes the organic matter that has been depleted over time. The collection of biosolids has become big business as well as the practice of spreading it on agricultural fields to condition the soil and to enhance crop production. However, over-application or uneven placement of phosphate materials on a soil surface can have a negative impact on crop yield. In other words, the soil surface and crops can become "cooked", especially if a drought is experienced.

Currently, most biosolids are applied to land using spreaders and then a disc is used in attempt to incorporate the spread biosolids into the soil. This method of application is often criticized for causing significant odors, especially if a rainfall occurs before the biosolids are incorporated in to the soil. Runoff of the biosolids, which often includes phosphorous and nitrogen, into nearby lakes and streams is another problem with current incorporation methods. Further, application of biosolids via spreading and then incorporation with a disc fails to fully appreciate the vital nutritional value thereof, namely, the biosolids are not placed in the "root zone" of crops in the field. The root zone of many crops is at least 8" below ground level. Yet another with the conventional procedure with spreading and then incorporation with a disc is soil compaction caused by repeated passes by a tractor and the spreading and incorporation equipment.

Therefore, it would be desirable to have a compost insertion apparatus that inserts biosolids, manures, ag-lime, and the like directly into a subsurface position in soil (e.g. 8 to 12 inches below the surface), such as in a field prior to planting crops. Further, it would be desirable to have a solid compost insertion apparatus having "tracks" instead of traditional wheels so as to reduce the compaction of the soil. In addition, it would be desirable to have a solid compost insertion apparatus that includes a camera for viewing a non-stick bin configured to hold between 16 to 26 tons of biosolid material for insertion into the soil.

SUMMARY OF THE INVENTION

A solid compost insertion apparatus coupled to a tractor for inserting solid or semi-solid material into the ground according to the present invention includes a frame selectively coupled to a rear attachment member of the tractor so as to be pulled by forward movement of the tractor. A bin is mounted atop the frame and having a closed bottom and at least one side wall extending upwardly from the bottom that defines an open top and an interior area capable of holding a volume of the solid material, the bottom having an outlet through which the solid material is selectively expelled from the interior area. An auger assembly is positioned in the interior area that includes a shaft having an elongate tubular configuration and a continuous spiral blade extending about the shaft, the shaft extending through the outlet and being rotationally operative when energized so that the solid material is expelled from the interior area of the bin.

A ripper shank assembly includes a ripper shank secured to a ripper shank frame, the ripper shank frame being operative to move from a storage configuration to a use configuration, wherein, in the use configuration, the ripper shank forms a furrow in the ground, the solid material being expelled into the furrow. A furrow closer assembly is coupled to the frame behind the auger assembly, the furrow closing assembly comprising two circular angled plates disposed about a connection member to form a V-shape for covering the solid material. A track assembly is operatively coupled to the frame for supporting the bin above the ground, the track assembly having a wide profile in contact with the ground.

Therefore, a general object of this invention is to provide a solid compost insertion apparatus for inserting biosolids into a subsurface position at least 8" below a ground surface in a single pass operation.

Another object of this invention is to provide a solid compost insertion apparatus, as aforesaid, that includes "tracks" for mobility instead of traditional wheels so as to reduce the compaction of the soil.

Still another object of this invention is to provide a solid compost insertion apparatus, as aforesaid, having a camera for viewing a non-stick bin configured to hold between 16 to 26 tons of biosolid material for insertion into the soil.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a sectional view taken along line 2b-2b of FIG. 2a;

FIG. 4b is an isolated view on an enlarged basis taken from FIG. 4a;

FIG. 4c is an isolated view on an enlarged basis taken from FIG. 4a;

FIG. 5b is a perspective view of the auger shaft as in FIG. 5a;

FIG. 6a is a side view of the is an isolated view on an enlarged basis taken from FIG. 4a;

FIG. 6b is an isolated view on an enlarged basis taken from FIG. 6a;

DESCRIPTION OF THE PREFERRED EMBODIMENT

Figure 1:
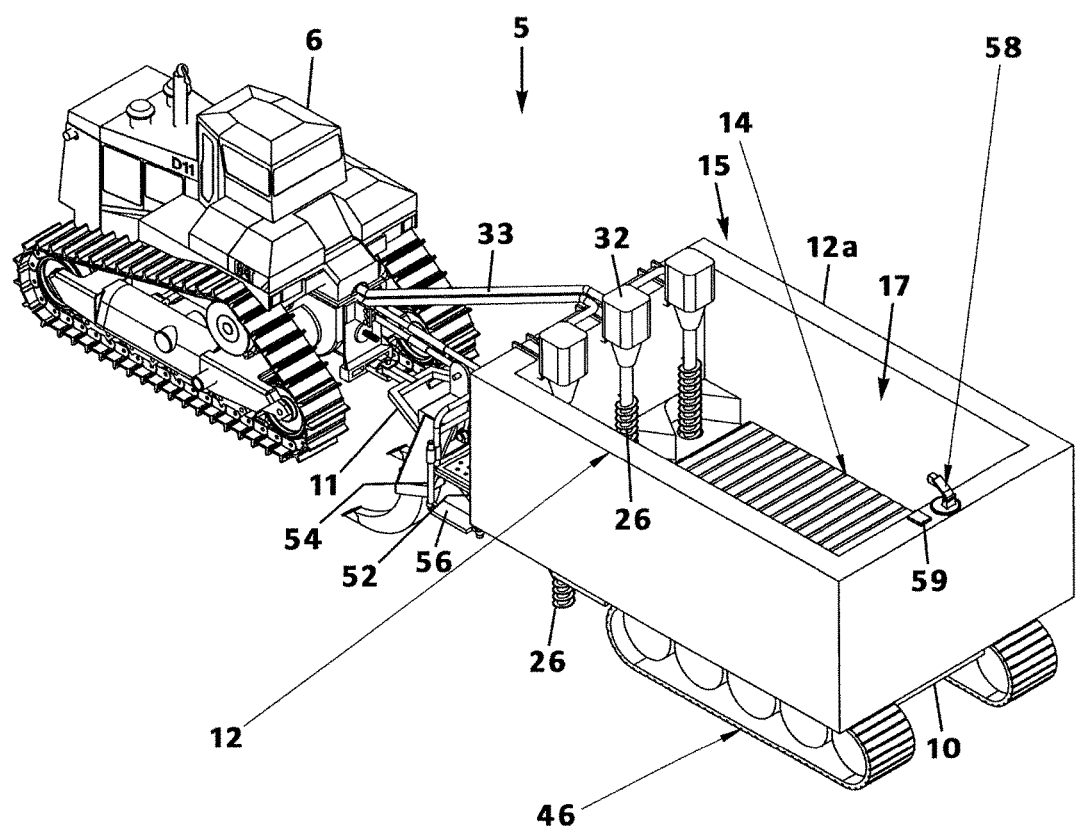
FIG. 1 is a perspective view of a solid compost insertion apparatus according to a preferred embodiment of the present invention.

A solid compost insertion system according to a preferred embodiment of the present invention will now be described with reference to FIGS. 1 to 10 of the accompanying drawings. The solid compost insertion system 5 includes a frame 10 and a bin 12 secured to the frame 10. The frame 10 is connected to a vehicle 6, such as a tractor, truck or other vehicle 6 via a hitch 11 such that the vehicle 6 pulls the system 5 along therewith. In embodiments, it may be preferable for the vehicle 6 to be equipped with tracks so as to minimally disrupt the ground upon which the vehicle 6 moves.

The bin 12 may take a variety of configurations. As shown in the figures, the bin 12 may be substantially rectangular, having at least one sidewall 12a extending upwardly from a floor 14 defining an open top 15 and an interior area 17 for holding product (e.g., biosolids). At least one sidewall 12a may be substantially vertical to accommodate the augers 26, as is described below. Optionally, the top may be covered, for example, with a retractable cover known to those in the art.

Bins 12 of any size may be utilized. In some embodiments, the bin 12 has a minimum capacity of about 16-18 tons of product, which is equivalent to approximately the size of a large dump truck. In other embodiments, the bin 12 has a capacity of about 18-26 tons. Larger, or smaller, bins 12 may optionally be utilized.

A catwalk 52 maybe disposed adjacent a side (e.g., front side) of the bin 12. The catwalk 52 allows an operator to access portions of the bin 12 and augers 24 for maintenance. In an embodiment, the catwalk 52 may be located approximately 3 feet from the top of the bin 12. The catwalk 52 may further include safety railings 54 and stairs 56 to allow the operator to safely and easily access the bin 12.

A camera 58 may be positioned atop an edge one of the sidewalls 12a (e.g., a back sidewall). The camera 58 may include one or more input feeds, which may be transmitted (e.g., wirelessly, through a wired connection, over Bluetooth, etc.) to a control center 60 inside the vehicle 6, illustrated in FIG. 10. The camera 58 may be equipped with the necessary electronics, e.g., through an electrical box 59, for operating the camera 58, including means for powering the camera 58, and components necessary for communicating with the control center 60 as is known to those of skill in the art.

The control center 60 may include a monitor 62 and one or more manual controls 64 for, among other actions, turning on the power-take-off (PTO) shaft, engaging the augers 26, and raising or lowering the ripper shanks 34, described in greater detail below. The monitor 62 may display the input received by the camera 58, which may provide the operator a view into the bin 12, and/or a view of the area around the system 5. In embodiments, the camera 58 may provide continuous real-time monitoring of the bin 12 and its surroundings, which may be displayed to the operator in real-time. The operator may thus continually monitor the system 5 and the surrounding area in order to swiftly address any problems that may arise.

Figure 2A:
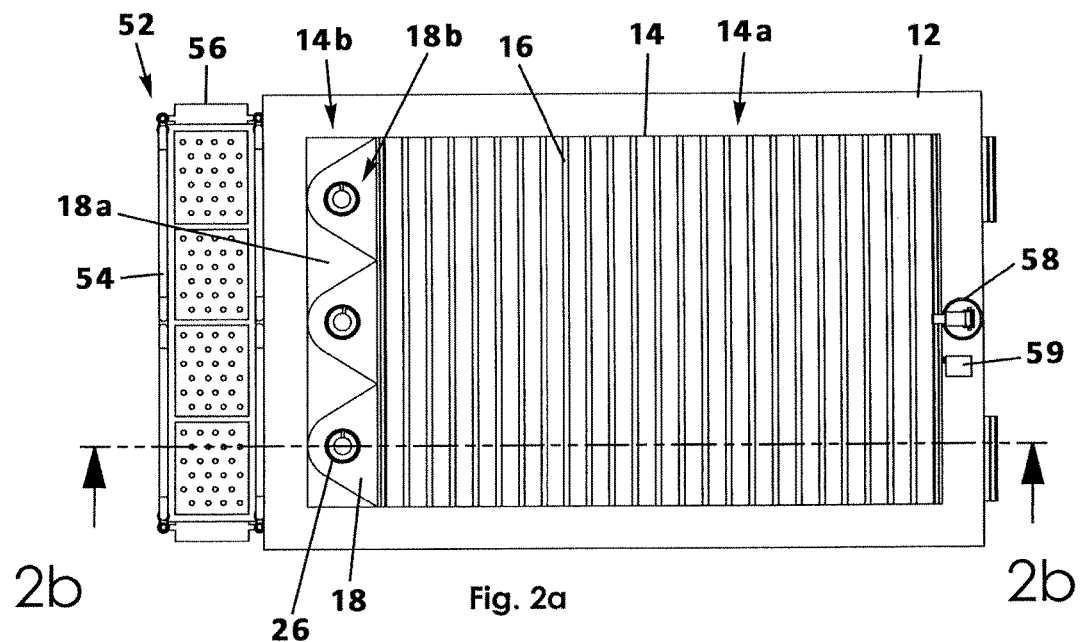
FIG. 2a is a top view of the solid compost insertion apparatus as in FIG. 1.
Figure 2B:
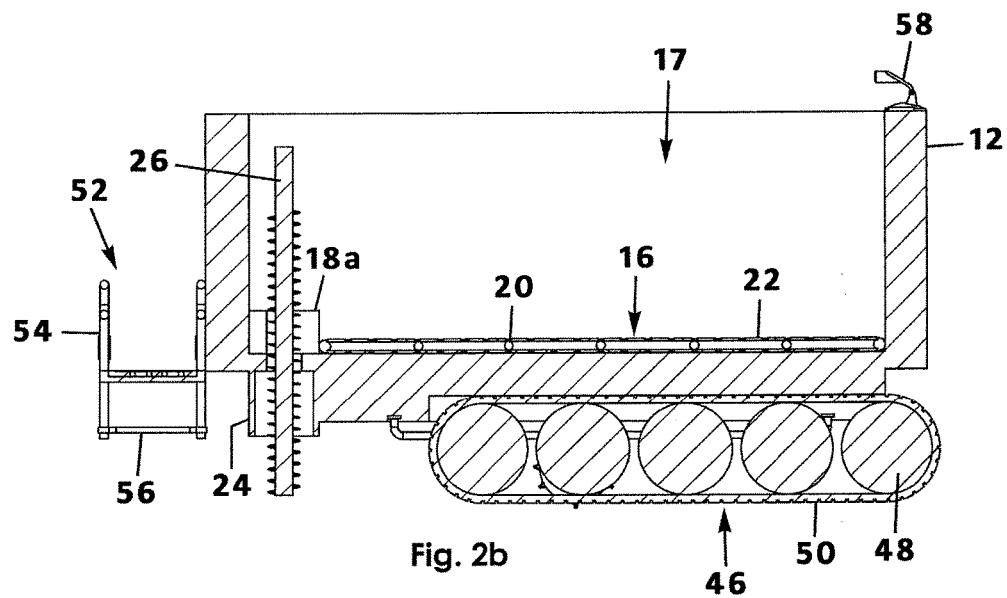
Figure 3:
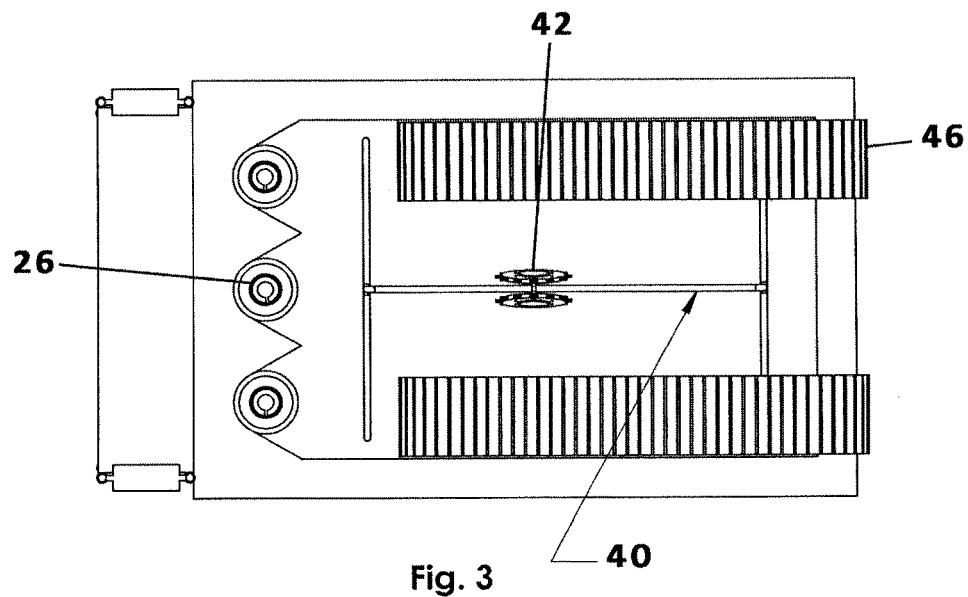
FIG. 3 is a bottom view of the solid compost insertion apparatus as in FIG. 1.

The bin 12 may be equipped with apparatus for moving product from the bin 12 to the ground. Referring now to FIGS. 1, 2a, and 2b, the floor 14 comprises a first portion 14a forming a conveyor 16, and a second portion 14b comprising a solid platform 18. The conveyor 16 may generally take the form of a conventional conveyor, and include a plurality of rollers 20 and a continuous belt 22 disposed around the rollers 20 (FIG. 2b). The rollers 20 may be mechanically controlled, causing the continuous track 22 to rotate about the rollers 20. In embodiments, one or more of the rollers 20 may be connected via a power-take-off (PTO) shaft that transfers power from the engine of the vehicle 6 to the rollers 20.

Figure 4A:
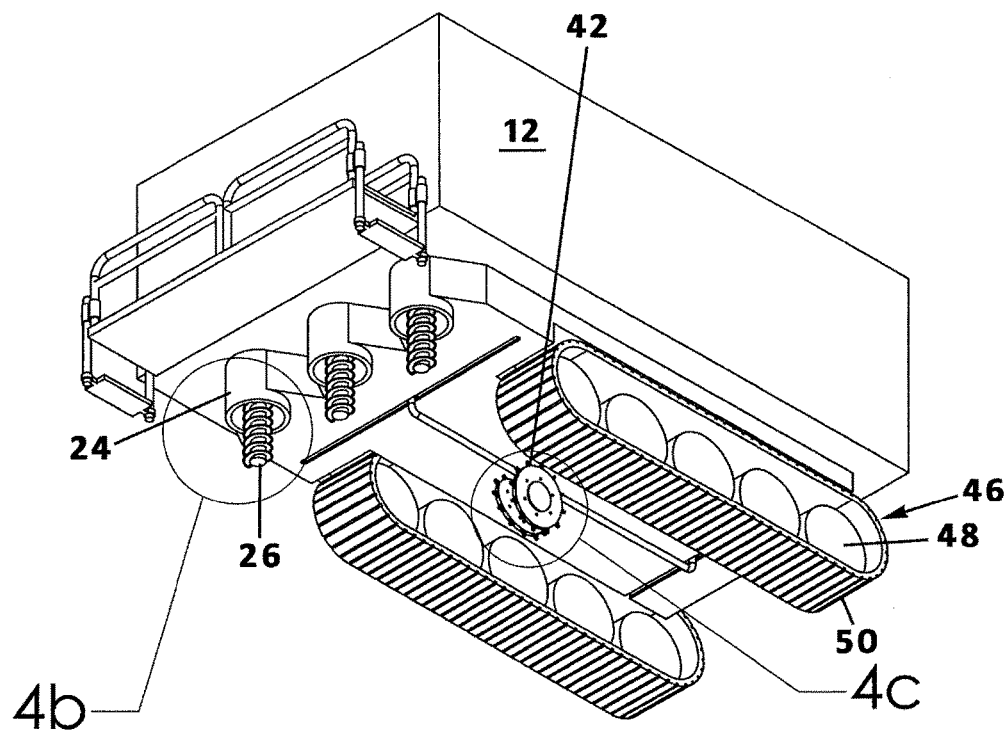
FIG. 4a is a bottom perspective view of the solid compost insertion apparatus as in FIG. 3.
Figure 4B:
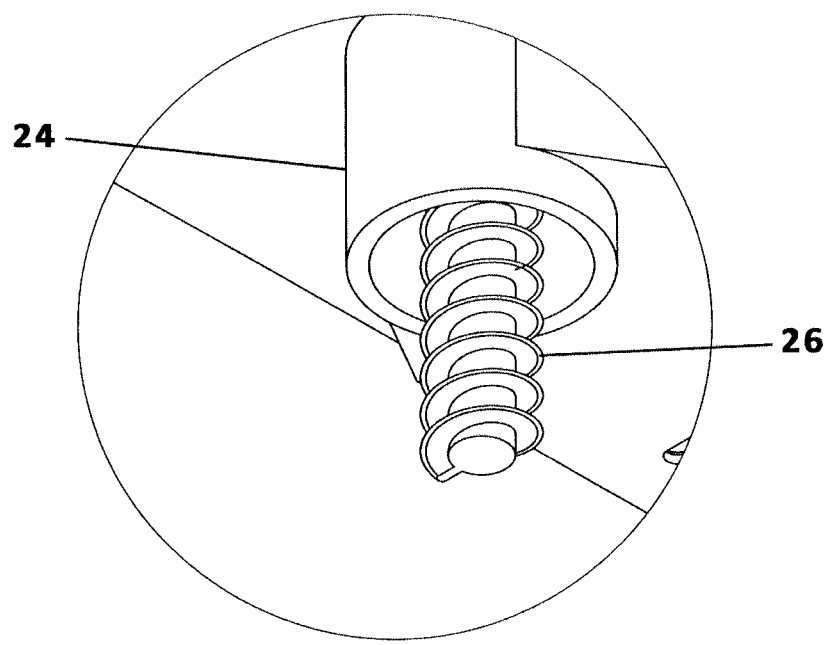
Figure 4C:
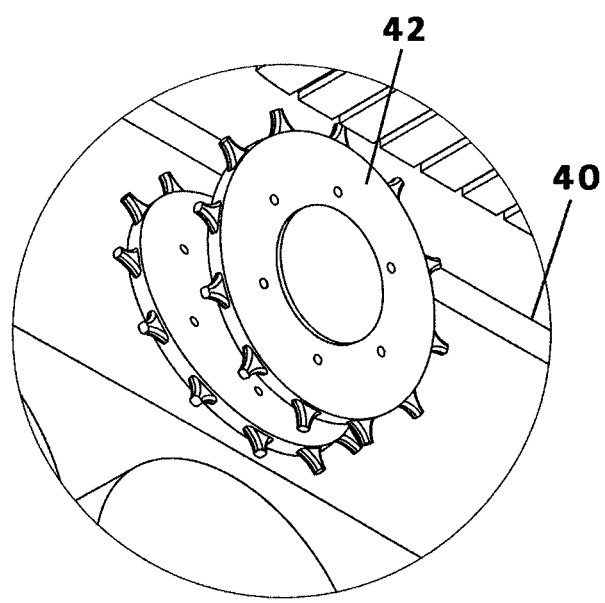

The platform 18 may include raised portions 18a with at least one cutout 18b formed therein for receiving an auger 26. The platform 18 may have a plurality of voids formed within the cutouts that extend the depth of the platform 18. A cylindrical casing extends from the bottom of the platform 18 towards the ground to form an injection port sleeve 24 (FIG. 4b). An auger 26 may be situated such that it extends through the void and the injection port sleeve 24.

In the embodiment shown in the figures, three injection ports sleeves 24 and three augers 26 are present. However, additional or fewer injection port sleeves 24 and augers 26 may be preferable. Further, the injection port sleeve(s) 24 may be equipped with a cover, which may be automatically or manually placed over an end of the injection port 24 when not in use. Preferably the cover may be placed over the top of the void in the event that an injection port sleeve 24 is present but an auger 26 is not placed therein. The cover may thus prevent product from flowing through the injection port sleeve 24 when an auger 26 is not present.

Figure 5A:
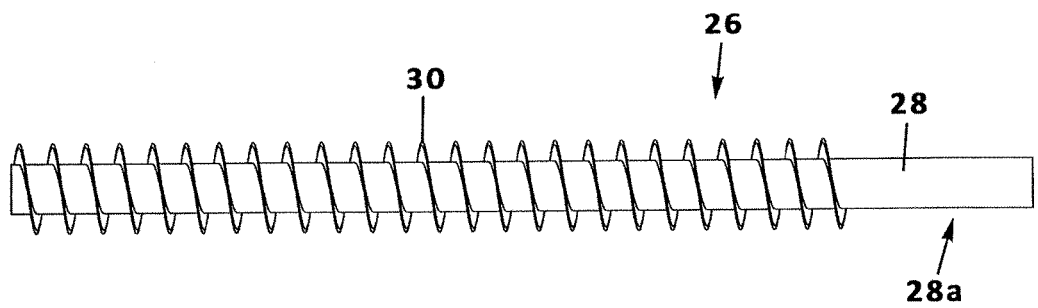
FIG. 5a is a top view of an auger shaft of an auger assembly according to the present invention.
Figure 5B:
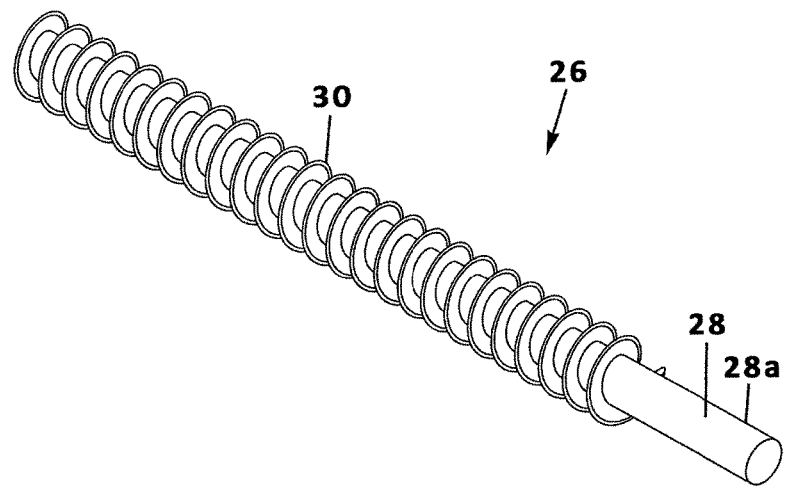

Referring now to FIGS. 5a and 5b, each auger 26 comprises a shank 28 and threading 30. A top portion 28a of the shank 28 may be received into drive box 32 (FIG. 1) which may be hydraulically connected via hoses 33 to the vehicle 6 to provide power to the augers 26. Alternately, in embodiments, the augers 26 may be powered via a PTO shaft extending from the vehicle 6 to a gear box, which translates the horizontal rotational energy from the PTO shaft to vertical rotation of the augers 26. The augers 26 may be attached to the gear box using methods known to those in the art.

When activated, the conveyor 16 acts to move the product toward the augers 26. The augers 26 are rotated as described above, which moves the product from the bin 12 to the ground. In embodiments, the augers 26 may be raised and lowered (e.g., via the hydraulic hoses 33) to accommodate varying furrow depths.

Figure 6A:
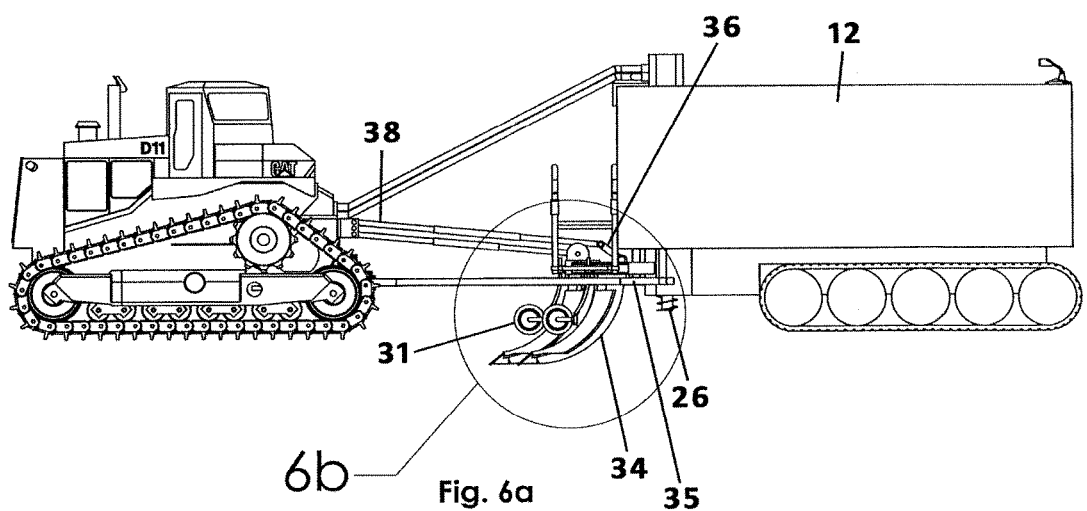
Figure 6B:
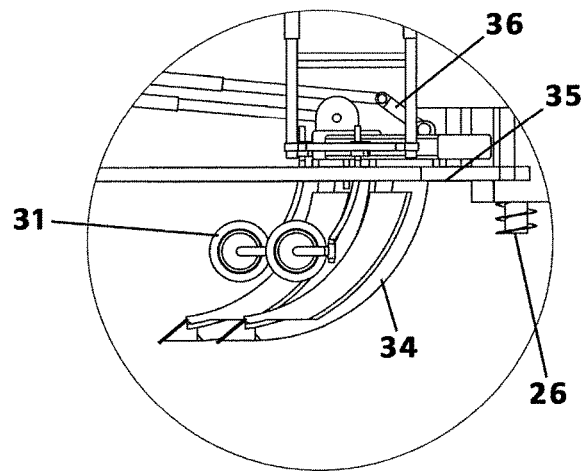
Figure 7:
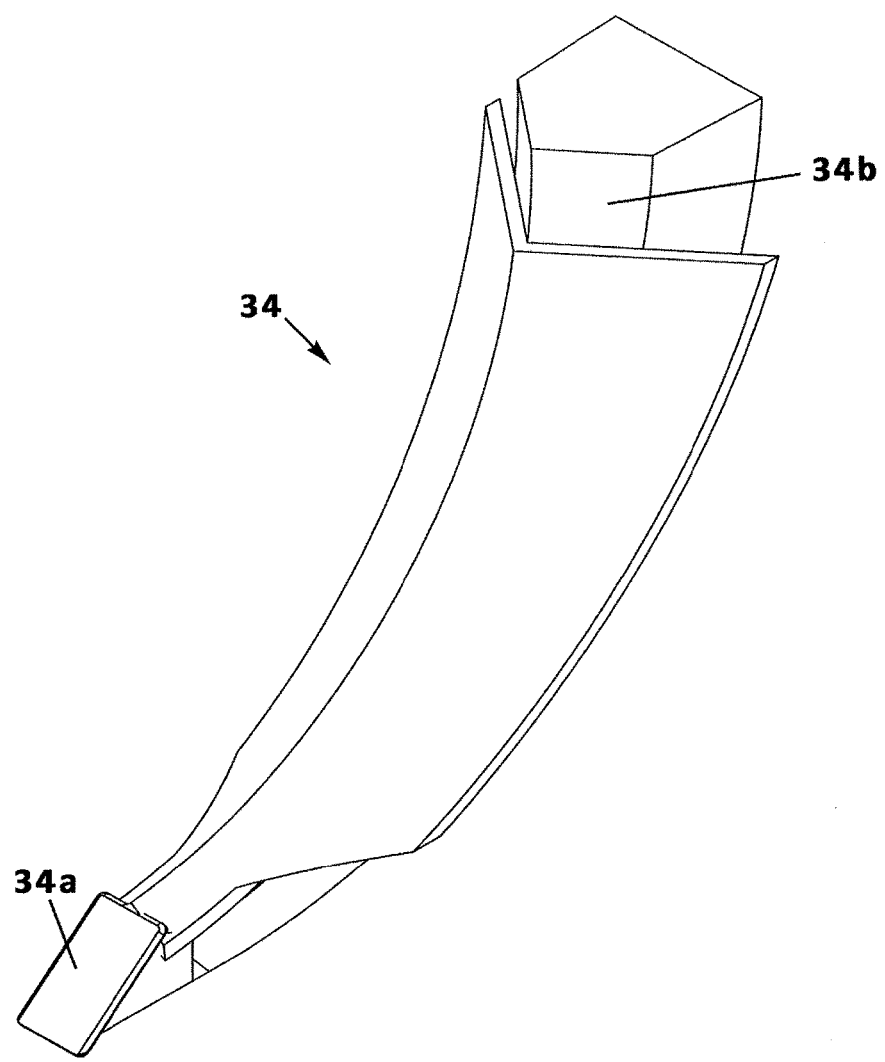
FIG. 7 is a perspective view on an enlarged scale of a ripper shank removed from the apparatus of FIG. 1.

Referring now to FIGS. 6a, 6b, and 7, the furrows may be created by ripper shanks 34 adjustably mounted to the frame 10. A head 34a on the ripper shank 34 may break up and cut through compacted soil before the augers 26 reach the soil. The ripper shanks 34 may preferably be flared from the head 34a to the top 34b of the shank 34 (FIG. 7) so as to push the soil away from the ripper shanks 34 as it moves through the ground, thus creating the furrow as the vehicle 6 pulls the system 5 over the ground. In addition, a no-till coulter 31 may be positioned directly in front of the ripper shanks 34 for cutting through trash and fodder and eliminating "balling" or clogging of the apparatus.

A separate frame 35 may connect the ripper shanks 34 to a hydraulic cylinder 36, which can raise or lower the ripper shanks 34 to form shallower or deeper furrows, respectively. To ensure that the biosolids are easily able to reach the root zone, the height of the ripper shanks 34 may be adjusted such that the nutrients are received into the ground approximately 8 to 12 inches or more below the surface. Additionally, the ripper shanks 34 may be raised into a storage position away from the ground. The hydraulic cylinder 36 may be connected (e.g., via cables 38) to the vehicle 6 to allow the operator to control movement of the cylinder 36, and therefore the ripper shanks 34.

The ripper shanks 34 are mounted to the frame 35 directly in front of the augers 26 to ensure that the biosolids are deposited directly into the furrows. In one embodiment, the ripper shanks 34 are mounted to the frame 35 at approximately 20 to 30 inches on center, although this is exemplary only and the ripper shanks 34 may be mounted at any interval, so long as the ripper shanks 34 are substantially directly in front of the augers 26.

In operation, the ripper shanks 34 are lowered to the desired position to produce the appropriate furrow depth. As the vehicle 6 moves forward creating the furrows, product is pushed towards the augers 26 via the conveyor 16 and deposited into the ground.

Figure 8:
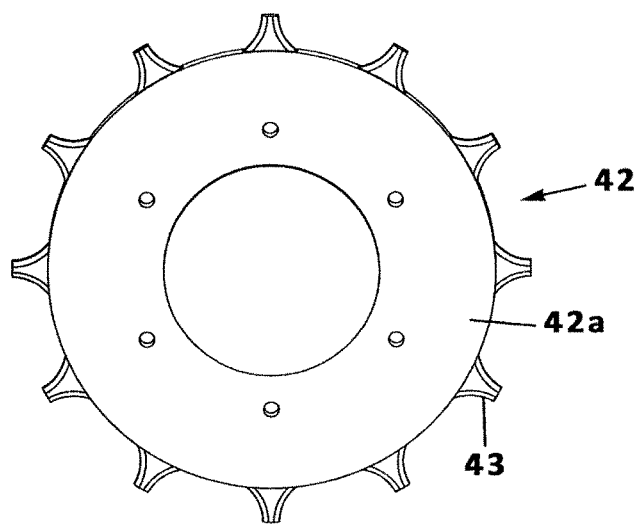
FIG. 8 is a side view of a furrow closing wheel removed from the apparatus of FIG. 1.
Figure 9:
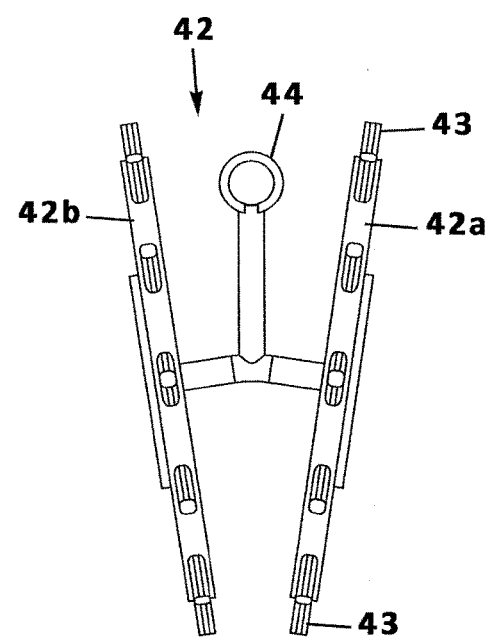
FIG. 9 is a front view of a pair of closing wheels of the apparatus of FIG. 1.
Figure 10:
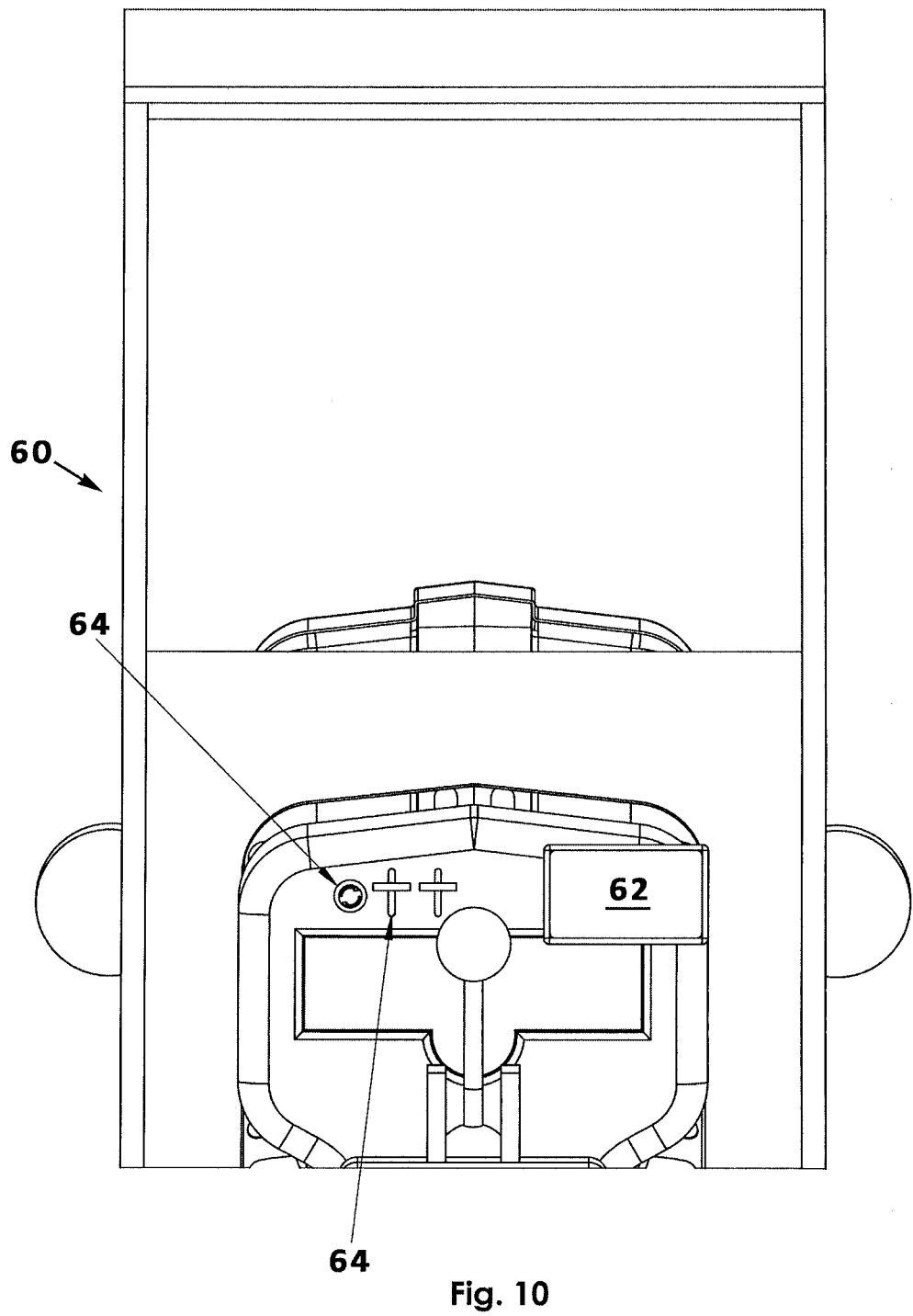
FIG. 10 is a perspective view of a control module illustrated in use in the cab of a tractor.

As described herein, the biosolids deposited into the ground may be considered a nuisance. Accordingly, the system 5 preferably includes means for covering up the biosolids immediately after being deposited into the furrows. With attention directed towards FIGS. 3, 4a, 4c, 8 and 9, mounted directly behind the center auger 26 is a furrow closer railing 40 upon which a furrow closer wheel 42 is mounted (FIGS. 8 and 9). The furrow closer wheel 42 includes two opposing angled plates 42a and 42b secured (e.g., bolted, welded, etc.) to a connection member 44 which attaches to the furrow closer railing 40. The plates may be angled between about 10 and 30 degrees from vertical such that they form a "V" shape. The furrow closing wheel 42 is positioned such that teeth 43 on the edges of the angled plates 42a and 42b touch the ground to persuade the soil into the furrows. As the vehicle 6 moves along the ground, the angled plates 42a and 42b push the dirt in towards the furrows and over the biosolids. The biosolids are therefore completely covered almost immediately upon being deposited into the furrows.

Optionally, furrow closer wheels 42 may additionally be positioned behind the outermost augers 26. In one embodiment, the outer most furrows are closed by tracks 46 mounted to the frame 10. The tracks 46 may be mounted substantially directly behind the outermost augers 26. The tracks 46 include a plurality of wheels 48 and a continuous belt 50 disposed around the plurality of wheels 48. The continuous belt 50 may rotate about the wheels 48 when the system 5 is pulled behind the vehicle 6. In an embodiment, the wheels 48 may be powered, e.g., via the PTO shaft. As the tracks 44 move over the furrows, dirt is pushed into the furrows, covering the biosolids.

The biosolids may form a slurry in the bin 12. The slurry may tend to build up on the surfaces of the bin 12, augers 26, ripper shanks 34, etc. Accordingly, the surfaces of the bin 12, augers 26, ripper shanks 34, and any other surface that may come into contact with the biosolids may be coated in a non-stick material to prevent or limit the amount of caking that occurs thereon.

It is understood that while certain forms of this invention have been illustrated and described, it is not limited thereto except insofar as such limitations are included in the following claims and allowable functional equivalents thereof.

The invention claimed is:

1. A solid compost insertion apparatus coupled to a vehicle for inserting solid material into the ground, comprising:
   a frame selectively coupled to a rear attachment member of the vehicle;
   a bin mounted atop said frame and having a floor and at least one exterior side wall extending upwardly and vertically from said bottom so that said floor and said exterior side wall, collectively, define an interior area, said floor defining an outlet through which said solid material is selectively expelled;
   an auger assembly positioned in said bin comprising an auger having a shaft and a continuous spiral blade extending about said shaft, said shaft extending vertically through said outlet and vertical relative to said floor and being selectively rotatable;
   an injection port sleeve extending upwardly from said floor of said bin and in communication with said outlet, said auger extending vertically through said injection port sleeve;
   wherein said floor includes a first portion having a conveyor positioned horizontally and parallel to said floor and perpendicular to said injection port sleeve;
   wherein said bin includes a second portion comprising a solid platform, said solid platform comprising at least one raised portion forming a cutout for receiving said auger;
   a ripper shank assembly comprising a ripper shank secured to said frame, said ripper shank forming a furrow in the ground, said solid material being expelled into said furrow; and
   a drive assembly having at least one track and a continuous belt disposed around a plurality of rollers and in contact with the ground.

2. The apparatus of claim 1, further comprising a furrow closer assembly comprising a furrow closer wheel comprising first and second angled circular plates having a plurality of teeth disposed along an outside edge of each of the first and second angled circular plates, said first and second angled circular plates being disposed on a connection member joined to said frame, wherein said furrow closer wheel closes the furrow as said vehicle moves along the ground.

3. The apparatus of claim 2, further comprising a catwalk secured adjacent a side of said bin and positioned about 3 feet below said open top for access to said interior area and said auger, said catwalk comprising a platform and a railing system.

4. The apparatus of claim 2, wherein a camera is disposed along a top edge of said bin, said camera being in data communication with a control center inside the vehicle, said control center comprising a monitor, wherein said camera receives image data, said image data being displayed on said monitor.

5. A solid compost insertion apparatus coupled to a vehicle for inserting solid material into the ground, comprising:
   a frame selectively coupled to a rear attachment member of the vehicle;

a bin mounted atop said frame and having a floor and at least one exterior side wall extending upwardly and vertically from said bottom so that said floor and said exterior side wall, collectively, define an interior area, said floor defining an outlet through which said solid material is selectively expelled;

an auger assembly positioned in said bin comprising an auger having a shaft and a continuous spiral blade extending about said shaft, said shaft extending vertically through said outlet and vertical relative to said floor and being selectively rotatable;

an injection port sleeve extending upwardly from said floor of said bin and in communication with said outlet, said auger extending vertically through said injection port sleeve;

wherein said floor includes a first portion having a conveyor positioned horizontally and parallel to said floor and perpendicular to said injection port sleeve;

wherein said bin includes a second portion comprising a solid platform, said solid platform comprising at least one raised portion forming a cutout for receiving said auger;

a ripper shank assembly comprising a ripper shank secured to said frame, said ripper shank forming a furrow in the ground, said solid material being expelled into said furrow;

wherein said ripper shank has a curved configuration and is flared in a V-shaped configuration from a first end of said ripper shank to a second end of said ripper shank;

a drive assembly having at least one track and a continuous belt disposed around a plurality of rollers and in contact with the ground;

wherein said auger assembly comprises a first auger laterally spaced apart from a second auger, the said first and second augers extending vertically through respective injection port sleeves in said bin and perpendicular to said conveyor.

6. The apparatus of claim 5, wherein said ripper shank is selectively attached to a ripper shank frame, said ripper shank frame being operable to move said ripper shank from a storage configuration to a use configuration.

7. The apparatus of claim 5, wherein said ripper shank is disposed substantially directly in front of said auger, and said furrow closing assembly is disposed substantially directly behind said auger.

* * * * *